(12) United States Patent
Park

(10) Patent No.: US 7,362,490 B2
(45) Date of Patent: Apr. 22, 2008

(54) ELECTROCHROMIC MIRROR OR WINDOW DISPLAYING INFORMATION

(75) Inventor: Kee Yong Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 11/269,569

(22) Filed: Nov. 9, 2005

(65) Prior Publication Data

US 2006/0098264 A1    May 11, 2006

(30) Foreign Application Priority Data

Nov. 11, 2004  (KR)  ............... 10-2004-0091813
Aug. 18, 2005  (KR)  ............... 10-2005-0075748

(51) Int. Cl.
*G02B 1/15* (2006.01)

(52) U.S. Cl. .................... 359/265; 359/245

(58) Field of Classification Search ............... 359/265, 359/275, 290, 291, 295, 298, 245, 270, 296, 359/297
See application file for complete search history.

(56) References Cited

U.S. PATENT DOCUMENTS

| | | | | |
|---|---|---|---|---|
| 4,008,950 A | * | 2/1977 | Chapman et al. | ........... 359/271 |
| 4,229,080 A | * | 10/1980 | Take et al. | ................. 359/266 |
| 4,256,379 A | * | 3/1981 | Green | ......................... 359/270 |
| 4,310,220 A | * | 1/1982 | Kuwagaki et al. | ......... 359/267 |
| 4,728,177 A | * | 3/1988 | Green | ......................... 359/270 |
| 4,741,603 A | * | 5/1988 | Miyagi et al. | .............. 359/270 |
| 5,239,406 A | | 8/1993 | Lynam | |
| 6,667,825 B2 | * | 12/2003 | Lu et al. | ...................... 359/265 |
| 6,700,692 B2 | * | 3/2004 | Tonar et al. | ................ 359/265 |
| 6,785,036 B1 | * | 8/2004 | Berneth et al. | ............. 359/271 |
| 6,906,842 B2 | * | 6/2005 | Agrawal et al. | ........... 359/265 |
| 7,009,751 B2 | * | 3/2006 | Tonar et al. | ................ 359/265 |

FOREIGN PATENT DOCUMENTS

| | | |
|---|---|---|
| KR | 10-2001-0028521 A | 4/2001 |
| KR | 1020010087586 A | 9/2001 |
| KR | 10-2003-0030605 A | 4/2003 |
| KR | 10-2003-0037100 A | 5/2003 |
| WO | WO00/49454 | 8/2000 |

\* cited by examiner

*Primary Examiner*—Timothy Thompson
(74) *Attorney, Agent, or Firm*—McKenna Long & Aldridge LLP

(57) ABSTRACT

Disclosed is an electrochromic mirror or window. The electrochromic mirror or window includes a first substrate including a first electrode, a second substrate including a second electrode, an electrolyte filled in a gap formed between the first and second substrates and including ions related to an electrochromic reaction, and an electrochromic layer provided on the second electrode to change its color depending on an electric signal applied thereto. The electrochromic layer is patterned on the second electrode with a predetermined configuration to display information. The electrochromic mirror or window displays information, such as messages, pictures or time, by patterning the information in the electrochromic layer.

15 Claims, 4 Drawing Sheets message image such as logo,　　information display such as
picture or photograph　　time or temperature

ELECTROCHROMIC MIRROR OR WINDOW DISPLAYING INFORMATION

This application claims the benefit of the filing date of Korean Patent Application Nos. 2004-91813 and 2005-75748, filed on Nov. 11, 2004, and Aug. 18, 2005, respectively in the Korean Intellectual Property Office, the disclosure of which is incorporated herein in its entirety by reference.

BACKGROUND OF THE INVENTION

1. Field of the Invention

The present invention relates to an electrochromic mirror or window capable of displaying information using an electrochromic display (ECD).

2. Description of the Prior Art

Generally, an electrochromic display (ECD) is a non-emissive display capable of adjusting the color of an electrochromic material through controlling the chemical reaction of the electrochromic material by applying an electric signal to the electrochromic material.

Such an ECD is applied to a smart mirror or a smart window. The smart mirror is used as a rear view mirror of a vehicle. If strong light is applied thereto from behind of the vehicle, the smart mirror is automatically colorized thereby preventing glare. When the smart window is utilized as an external window of a building, the smart window can adjust transmittance of sunlight so that it is possible to save heating/cooling energy for the building. In addition, the smart window can be used as a unique interior decoration electrically controlling an exposed space inside of the building. However, the conventional ECD simply serves as a mirror or a window for adjusting reflectivity or transmittance of light using an electrochromic material.

FIG. 1 is a schematic view illustrating a basic structure of an ECD including a solid-phase electrochromic material provided on an electrode in the form of an electrochromic layer. Referring to FIG. 1, the ECD 1 includes a lower electrode 11 formed on a first glass substrate 10, an upper electrode 15 formed on a lower surface of a second glass substrate 16 while facing the lower electrode 11 and spaced away from the lower electrode 11 by a predetermined distance, an electrochromic layer 14 formed on a lower surface of the upper electrode 15 and including an electrochromic material changing its color depending on an electric signal applied thereto, an electrolyte layer 13 formed on a lower surface of the electrochromic layer 14 and including ions related to the electrochromic reaction, and an ion storage 12 formed on a lower surface of the electrolyte layer 13 for storing ions having polarity opposite to that of the ions related to the electrochromic reaction. Generally, at least one of the lower and upper electrodes 11 and 15 is a transparent electrode, such as indium tin oxide (ITO) electrode. The ion storage 12 can be omitted and the electrolyte layer 13 can be replaced with an ionic liquid layer including ionic liquid.

If voltage is applied to the ECD 1, current flows from the electrochromic layer 14 to the ion storage 12, thereby coloring the electrochromic layer 14. In contrast, if the current flows from the ion storage 12 to the electrochromic layer 14, the electrochromic layer 14 is decolored. The above coloring and decoloring reactions of the electrochromic layer 14 may also occur with the current flow inverse to the above current flow depending on materials of the electrochromic layer 14.

If the upper electrode 15 is a transparent electrode and the lower electrode 11 is a metal electrode (other elements are assumed as transparent elements), the ECD 1 shown in FIG. 1 can be used as a smart mirror capable of electrically adjusting reflectivity of light. In the meantime, if the upper and lower electrodes 15 and 11 are transparent electrodes (other elements are assumed as transparent elements), the ECD 1 shown in FIG. 1 can be used as a smart window capable of electrically adjusting transmittance of light.

SUMMARY OF THE INVENTION

Differently from the ECD having the structure as shown in FIG. 1, currently available ECDs have structures including a liquid-phase electrochromic material contained in the electrolyte. In this case, the ECDs have simple functions of adjusting transmittance and reflectivity of the light. In the meantime, if these types of conventional ECDs are used for a mirror or a window, an electrochromic material of the conventional ECD only adjusts the transmittance and reflectivity of the light in the mirror or the window. However, the present invention provides an electrochromic mirror or window capable of displaying information such as messages, pictures or time by forming an electrochromic layer including a solid-phase electrochromic material and patterning the electrochromic layer in a desired pattern to display information.

According to the present invention, there is provided an electrochromic mirror or window comprising: a first substrate including a first electrode; a second substrate including a second electrode; an electrolyte filled in a gap formed between the first and second substrates and including ions related to an electrochromic reaction; and an electrochromic layer provided on the second electrode to change its color depending on an electric signal applied thereto, wherein the electrochromic layer is patterned on the second electrode with a predetermined configuration to display information.

According to the exemplary embodiment of the present invention, the second electrode is patterned on the second substrate matching with the predetermined configuration of the electrochromic layer.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiment of the present invention, examples of which are illustrated in the accompanying drawings. Wherever possible, the same reference numbers will be used throughout the drawings to refer to the same or like parts.

Figure 1:
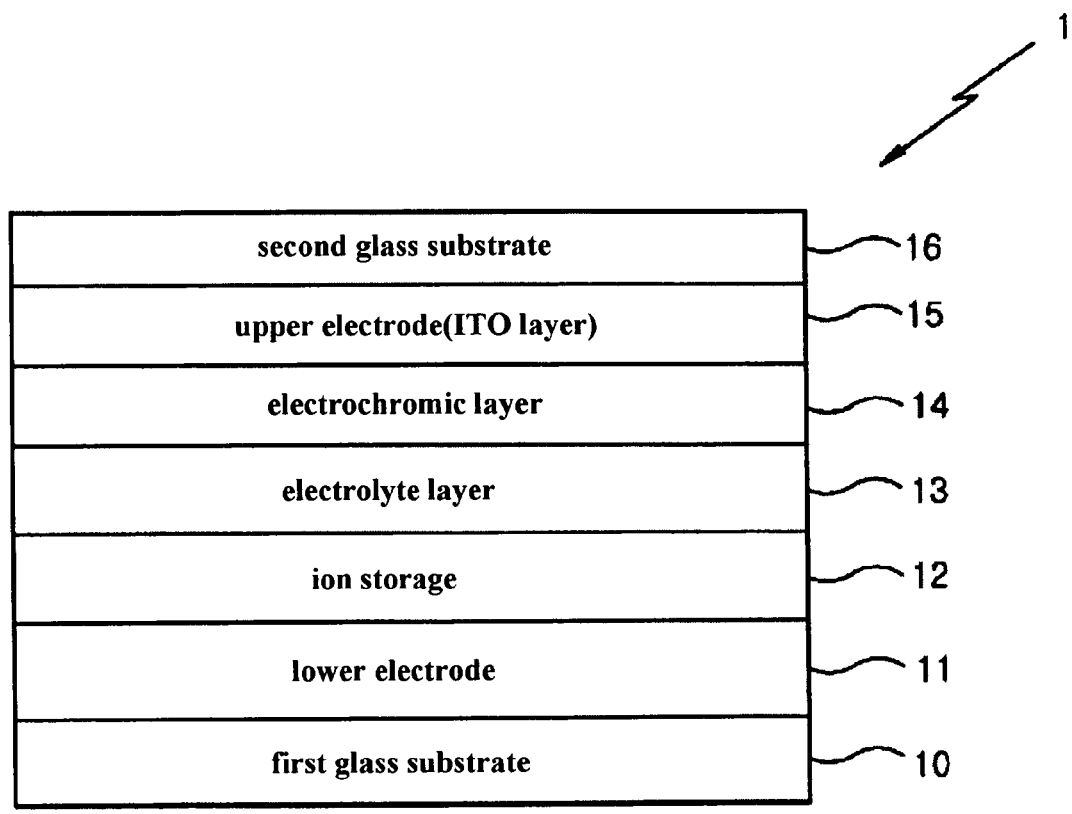
FIG. 1 is a schematic view illustrating a basic structure of an electrochromic display.

Referring to FIG. 1, an ECD 1 according to the present invention includes a lower electrode 11 formed on an upper surface of a first glass substrate 10, an ion storage 12 formed on an upper surface of the lower electrode 11 in order to store ions having polarity opposite to that of the ions related to the electrochromic reaction, an electrolyte layer 13 formed on an upper surface of the ion storage 12 and including ions related to the electrochromic reaction, an electrochromic layer 14 formed on an upper surface of the electrolyte layer 13 and including an electrochromic material changing its color depending on an electric signal applied thereto, an upper electrode 15 for supplying electric charges to the electrochromic layer 14 and a second glass substrate 16 formed on an upper surface of the upper electrode 15.

If current flows from the ion storage 12 to the electrochromic layer 14 due to voltage applied to the ECD 1, the electrochromic layer 14 is colored. In contrast, if the current flows from the electrochromic layer 14 to the ion storage 12, the electrochromic layer 14 is decolored. The above coloring and decoloring reactions of the electrochromic layer 14 may also occur with the current flow inverse to the above current flow depending on materials of the electrochromic layer 14.

The upper electrode 15 is a transparent electrode, such as an indium tin oxide (ITO) electrode or a fluorine-doped tin oxide (FTO) electrode. The ion storage 12 can be omitted if necessary and the electrolyte layer 13 can be replaced with an ionic liquid layer including ionic liquid.

Figure 2:
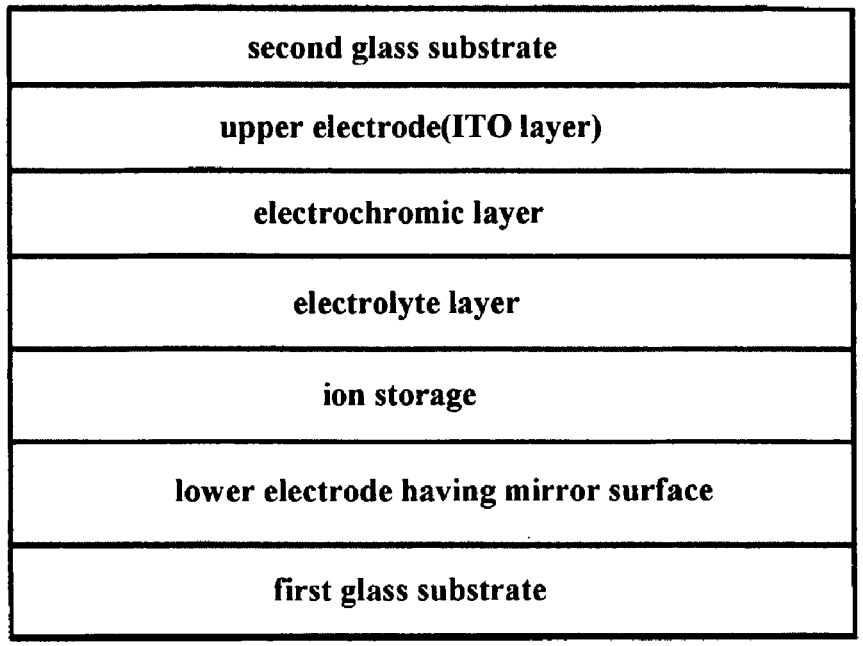
FIG. 2 is a schematic view illustrating an electrochromic mirror according to one embodiment of the present invention.
Figure 3:
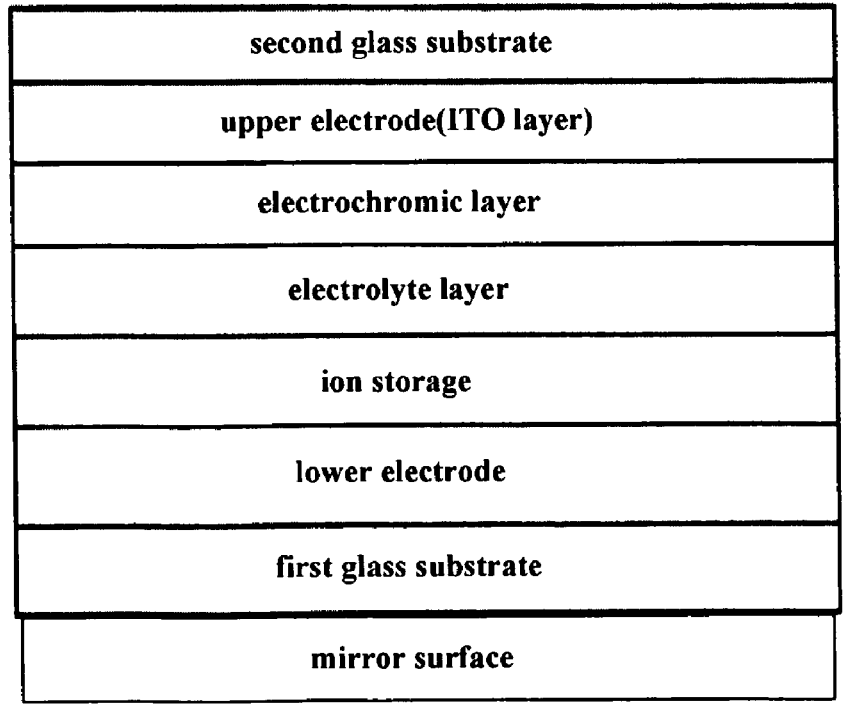
FIG. 3 is a schematic view illustrating an electrochromic mirror according to another embodiment of the present invention.

In a case of an electrochromic window, the lower electrode 11 is also in the form of a transparent electrode. In this case, the ion storage 12 is omitted or replaced with a transparent material. In a case of an electrochromic mirror, as shown in FIG. 2, a metal electrode is used as the lower electrode 11 such that the lower electrode 11 has a mirror surface. Alternatively, as shown in FIG. 3, the transparent electrode is used for the lower electrode 11 and the mirror surface is formed at an outer surface of the first glass substrate 10 or the second glass substrate 20. The present invention does not limit the method for fabricating the mirror surface.

The above electrochromic mirror and electrochromic window have the same electrochromic layer and upper electrode although they have lower electrodes having different structures, respectively. Thus, the following description will be focused on the electrochromic mirror for the purpose of convenience. That is, the description for the electrochromic mirror can also be applied to the electrochromic window.

Figure 4:
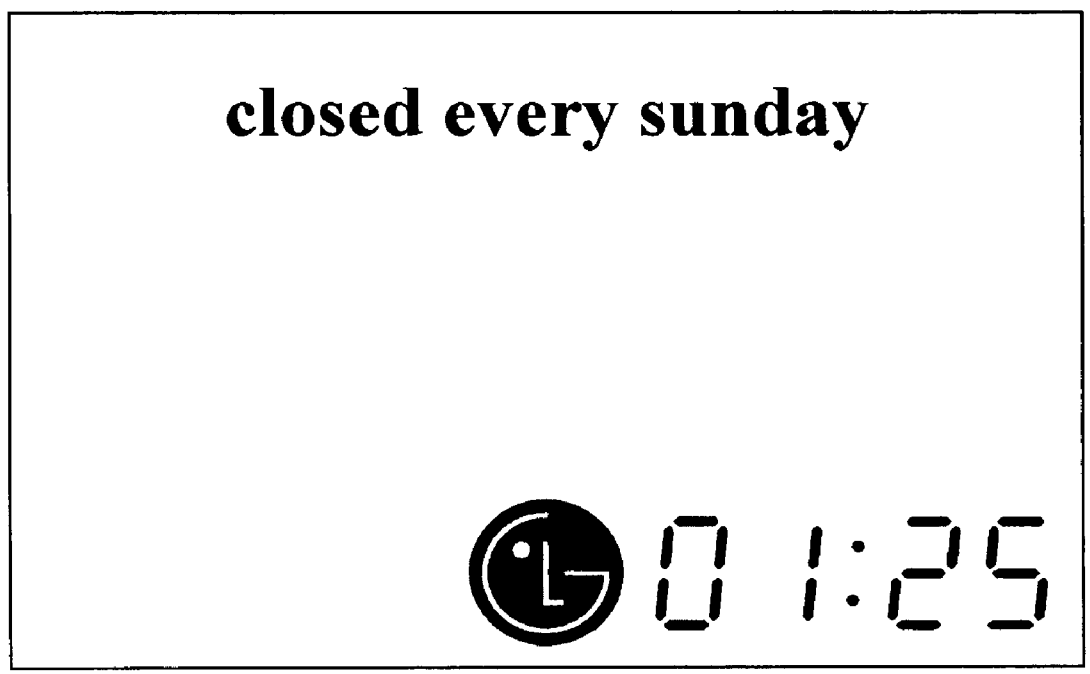
FIG. 4 is a view illustrating an electrochromic layer displaying information according to one embodiment of the present invention.

FIG. 4 is a top view of the electrochromic layer 14 shown in FIG. 1. According to the electrochromic mirror or window of the present invention, instead of a liquid-phase electrochromic material, a solid-phase electrochromic material is provided on an electrode in the form of the electrochromic layer 14 and information to be displayed is patterned on the electrochromic layer 14.

For example, if current flows from the ion storage 12 to the electrochromic layer 14 due to voltage applied to the ECD 1, the electrochromic layer 14 is colored. In contrast, if current flows from the electrochromic layer 14 to the ion storage 12, the electrochromic layer 14 is decolored. Therefore, if the information to be displayed is patterned on the electrochromic layer 14, the patterned information can be displayed when the electrochromic layer 14 is colored according to the voltage applied thereto.

The electrochromic material includes semiconductor oxide, which is sequentially deposited on an electrode coated on a substrate thereby forming the electrochromic layer 14.

For instance, the electrochromic material includes inorganic metal oxides, such as $WO_3$, $NiO$, or $TiO_2$, or organic substances, such as bipyridinium salt (viologen) derivatives, quinone-based derivatives including anthraquinone, or azine-based derivatives including phenothiazine.

Various processes, such as an etching process, a screen-printing process, an imprinting process or an inkjet printing process, can be used for patterning the electrochromic layer.

The information can be displayed in the electrochromic layer by using only one pattern or by combining at least two patterns spaced away from each other.

At this time, the electrochromic characteristics of the electrochromic layer having at least two patterns can be adjusted by using a single common second electrode. In addition, it is also possible to provide at least one pattern of the electrochromic layer on a second electrode layer including at least two electrodes, which are individually controlled by the driving circuit, such that the patterns can be connected to the electrodes, respectively.

Preferably, the second electrode is patterned on the second substrate matching with the predetermined configuration of the electrochromic layer.

If the second electrode is not provided with at least two electrodes, which are patterned in the substrate and individually controlled by the driving circuit, only a function of displaying all information patterned in the electrochromic layer or causing all the information to be transparent is possible.

For example, on the assumption that a part of the electrochromic layer displays a trade name or a trademark and the remaining part of the electrochromic layer displays a message used only for a specific day, if the second electrode is not patterned on the substrate, the message for the specific day may be always displayed with the trade name or the trademark. However, if the second electrode is patterned on the substrate, it is possible to display the trade name or the trademark in weekdays and display a message representing the closing of the store on holidays.

Furthermore, if the second electrode is patterned with predetermined configurations adaptable for specific uses (e.g., 7-segment, a dot matrix such as 5*7/5*8/16*16, a passive matrix, or an active matrix), the second electrode may serve as an information display capable of displaying a variety of information.

Figure 5:
FIG. 5 is a view illustrating a structure of an upper electrode for applying an electric signal to an electrochromic layer shown in FIG. 4.

For instance, the upper electrode (second electrode) as shown in FIG. 5 can be used in order to apply an electric signal to the electrochromic layer shown in FIG. 4. Although the electrode having a black color is shown in FIG. 5, the electrode actually has a transparent structure.

Figure 6:
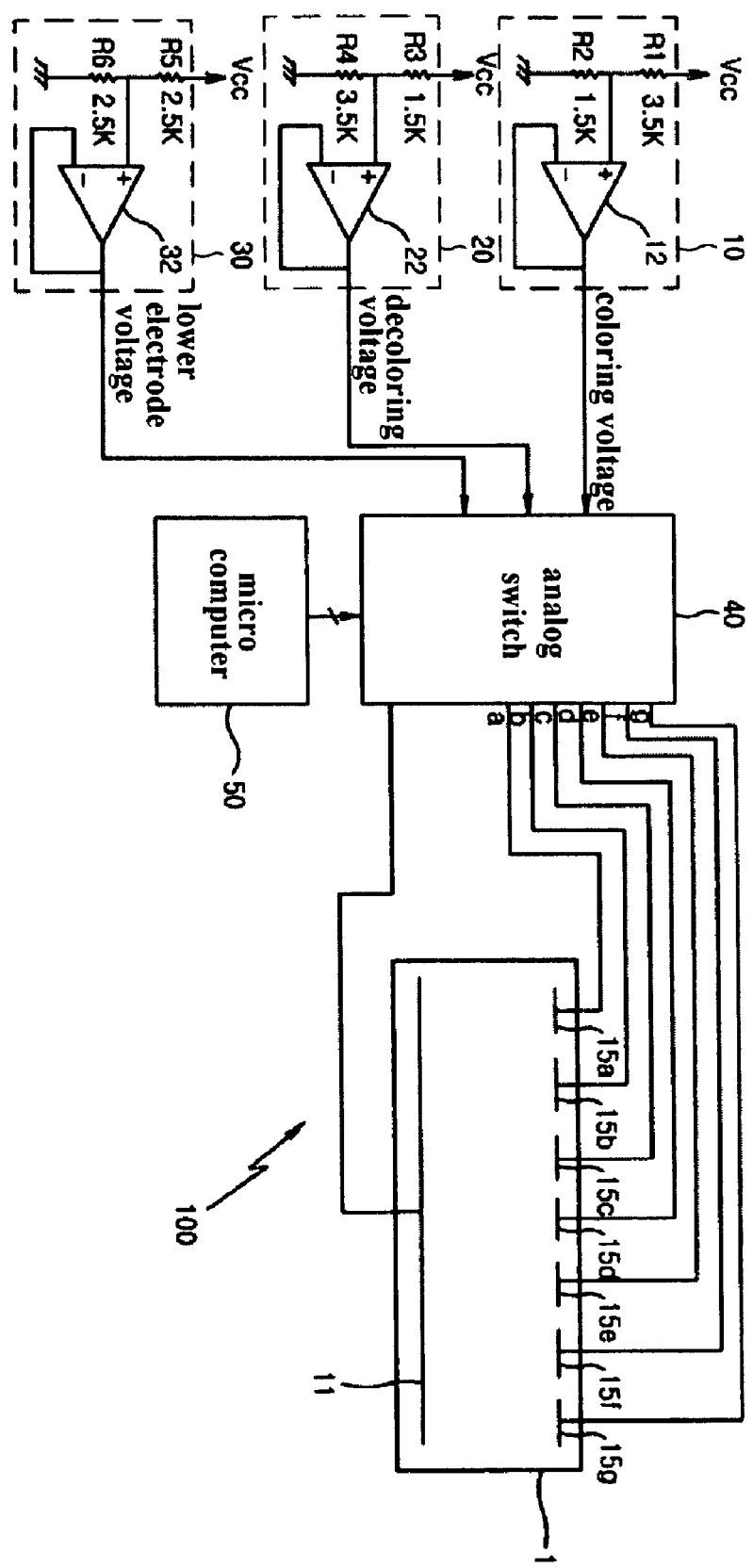
FIG. 6 is a schematic view illustrating a driving circuit for applying an electric signal to an upper electrode shown in FIG. 5 to display information.

FIG. 6 is a schematic view illustrating a driving circuit 100 for applying the electric signal to the upper electrode shown in FIG. 5 to display information. The driving circuit 100 includes a coloring voltage supply unit 10, a decoloring voltage supply unit 20, a lower electrode voltage supply unit 30, an analog switch 40 applying an electric signal to the ECD 1 by receiving coloring voltage, decoloring voltage and lower electrode voltage from the above units, and a micro controller 50 for controlling the operation of the driving circuit 100.

The coloring voltage supply unit 10, the decoloring voltage supply unit 20, and the lower electrode voltage supply unit 30 are voltage follower circuits including two resistors R1 to R6 and one OP-Amp 12, 22 and 32, respectively. The level of the coloring voltage, decoloring voltage and lower electrode voltage outputted from the coloring voltage supply unit 10, the decoloring voltage supply unit 20, and the lower electrode voltage supply unit 30 may be adjusted by controlling a resistance ratio between two resistors provided in each circuit. According to one embodiment of the present invention, the coloring voltage and decoloring voltage present the potential difference on the basis of the lower electrode voltage (reference voltage). The resistance values shown in FIG. 6 are preset to provide the coloring voltage of −1.0V and the decoloring voltage of 1.0V. The analog switch 40 receives the coloring voltage, decoloring voltage and lower electrode voltage from the coloring voltage supply unit 10, decoloring voltage supply unit 20, and lower electrode voltage supply unit 30, respectively. In addition, upon receiving the data signal from the micro controller 50, the analog switch 40 selectively supplies the coloring voltage or the decoloring voltage to upper electrodes 15a to 15g corresponding to segments a to g provided in the ECD 1 and supplies the lower electrode voltage to the lower electrode 11. The micro controller 50 can be replaced with a basic circuit device, such as a resistor, a condenser, an inductor, a diode, a transistor or a logic device.

Hereinafter, an operation of the electrochromic mirror including the electrochromic layer patterned with various information to be displayed according to one embodiment of the present invention will be described.

When the electrochromic layer 14 shown in FIG. 2 or 3 has been decolored, an entire surface of the electrochromic mirror is used as a mirror. If the electrochromic layer 14 has been colored, information such as a message, a logo, a picture, a photograph, a time or a temperature can be displayed in the electrochromic mirror. Thus, in the store, the electrochromic mirror can be used as a mirror in weekdays and can also be used to notify the closing of the store on holidays. In addition, in the office, the electrochromic mirror can be used as a mirror in ordinary times and can also be used to notify the absence or the outside duty of workers.

Users can input their photographs or favorite entertainer's photographs in the electrochromic layer, such that, while using as a mirror in ordinary times, the users can see the photographs at any time required by the users. If a display device, such as a 7-segment, is provided in the electrochromic layer, the electrochromic mirror can be used as a watch, a thermometer, or a calculator.

Although the present invention has been described in relation to the electrochromic mirror, it is also applicable for the electrochromic window.

As generally known in the art, the window can be equipped with color glass or color films can be attached to transparent glass of the window for specific purposes or to improve an external appearance of the window. Similarly, the electrochromic mirror or window according to the present invention can be equipped with a color glass substrate or color films can be attached to the glass substrate.

According to the present invention, the electrochromic mirror or window can display various information, such as messages, pictures or time, by patterning the information in the electrochromic layer.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A mirror comprising:
   a first substrate;
   a reflective layer forming a mirror surface; and
   an information display part formed on the first substrate or the reflective layer;
   wherein the information display part comprising:
   a) a first electrode formed on the first substrate;
   b) a second substrate positioned apart from the first electrode, and including a second electrode;
   c) an electrolyte filled in a gap formed between the first and second substrates and including ions related to an electrochromic reaction;
   d) an electrochromic layer provided on the first electrode or the second electrode to change its color depending on an electric signal applied thereto, patterned with a predetermined configuration to display information; and
   e) an ion storage for storing ions having polarity opposite to that of ions related to the electrochromic reaction.

2. The mirror as claimed in claim 1, wherein the first electrode or the second electrode is patterned on the first substrate or the second substrate matching with a predetermined configuration of the electrochromic layer.

3. The mirror as claimed in claim 1, wherein the electrochromic layer includes at least two patterns spaced away from each other.

4. The mirror as claimed in claim 3, wherein electrochromic characteristics of the electrochromic layer having at least two patterns is adjusted by using a single common first electrode or second electrode.

5. The mirror as claimed in claim 3, wherein the first electrode or the second electrode includes at least two electrodes, which are individually controlled by a driving circuit, and at least one of the patterns of the electrochromic layer is formed on each of at least two electrodes.

6. The mirror as claimed in claim 1, wherein all elements of the mirror, except for the reflective layer and the electrochromic layer, are transparent.

7. The mirror as claimed in claim 1, wherein the first electrode or the second electrode is the reflective layer forming a mirror surface.

8. The mirror as claimed in claim 1, wherein the reflective layer forming a mirror surface is formed at an outer surface of the first substrate or the second substrate.

9. The mirror as claimed in claim 1, wherein the electrolyte includes ionic liquid.

10. An window comprising:
    a first substrate; and
    an information display part formed on the first substrate, wherein the information display part comprising:
    a) a first electrode formed on the first substrate;
    b) a second substrate positioned apart from the first electrode, and including a second electrode;
    c) an electrolyte filled in a gap formed between the first and second substrates and including ions related to an electrochromic reaction;
    d) an electrochromic layer provided on the first electrode or the second electrode to change its color depending on an electric signal applied thereto, the electrochromic layer being patterned with a predetermined configuration to display information; and
    e) an ion storage for storing ions having polarity opposite to that of ions related to the electrochromic reaction, wherein all elements of the window, except for the electrochromic layer, are transparent.

11. The window as claimed in claim 10, wherein the first electrode or the second electrode is patterned on the first substrate or the second substrate matching with a predetermined configuration of the electrochromic layer.

12. The window as claimed in claim 10, wherein the electrochromic layer includes at least two patterns spaced away from each other.

13. The window as claimed in claim 12, wherein electrochromic characteristics of the electrochromic layer having at least two patterns is adjusted by using a single common first electrode or second electrode.

14. The window as claimed in claim 12, wherein the first electrode or the second electrode includes at least two electrodes, which are individually controlled by a driving circuit, and at least one of the patterns of the electrochromic layer is formed on each of at least two electrodes.

15. The window as claimed in claim 10, wherein the electrolyte includes ionic liquid.

* * * * *